(12) United States Patent
Karabinis

(10) Patent No.: US 8,064,824 B2
(45) Date of Patent: Nov. 22, 2011

(54) SYSTEMS AND METHODS FOR REDUCING POWER ROBBING IMPACT OF INTERFERENCE TO A SATELLITE

(75) Inventor: Peter D. Karabinis, Reston, VA (US)

(73) Assignee: ATC Technologies, LLC, Reston, VA (US)

( * ) Notice: Subject to any disclaimer, the term of this patent is extended or adjusted under 35 U.S.C. 154(b) by 694 days.

(21) Appl. No.: 12/145,118

(22) Filed: Jun. 24, 2008

(65) Prior Publication Data
US 2009/0011704 A1 Jan. 8, 2009

Related U.S. Application Data

(60) Provisional application No. 60/947,778, filed on Jul. 3, 2007.

(51) Int. Cl.
*H04B 7/185* (2006.01)

(52) U.S. Cl. ...... 455/13.4; 455/431; 455/12.1; 455/427; 455/278.1; 455/275; 348/607

(58) Field of Classification Search ............... 455/13.4, 455/431, 12.1, 427, 278.1, 275; 348/607
See application file for complete search history.

(56) References Cited

U.S. PATENT DOCUMENTS

| | | |
|---|---|---|
| 4,354,276 A | 10/1982 | Karabinis |
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |

(Continued)

FOREIGN PATENT DOCUMENTS

EP 0 506 255 A2 9/1992

(Continued)

OTHER PUBLICATIONS

P.D. Karabinis, "Maximum-Power and Amplitude-Equalizing Algorithms for Phase Control in Space Diversity Combining", Bell System Technical Journal, vol.62:1, pp. 63-89 (Jan. 1, 1983) XP001536882.

(Continued)

*Primary Examiner* — Sanh D Phu
(74) *Attorney, Agent, or Firm* — Myers Bigel Sibley & Sajovec

(57) ABSTRACT

Processing return feeder link signals at a satellite gateway including a first and second receive antennas includes receiving first and second return feeder link signals at the first and second receive antennas, respectively, modulating a phase of the first return feeder link signal to form an adjusted first feeder link signal, combining the adjusted first feeder link signal with the second return feeder link signal to form a combined feeder link signal, detecting periodic amplitude variation in the combined feeder link signal, and shifting a phase of the first return feeder link signal to reduce periodic amplitude variation in the combined feeder link signal.

27 Claims, 9 Drawing Sheets

U.S. PATENT DOCUMENTS

| | | |
|---|---|---|
| 5,631,898 A | 5/1997 | Dent |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,418,147 B1 | 7/2002 | Wiedeman |
| 6,449,461 B1 | 9/2002 | Otten |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman et al. |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,113,743 B2 | 9/2006 | Karabinis |
| 7,113,778 B2 | 9/2006 | Karabinis |
| 7,174,127 B2 | 2/2007 | Otten et al. |
| 7,181,161 B2 | 2/2007 | Karabinis |
| 7,203,490 B2 | 4/2007 | Karabinis |
| 7,218,931 B2 | 5/2007 | Karabinis |
| 7,295,807 B2 | 11/2007 | Karabinis |
| 7,340,213 B2 | 3/2008 | Karabinis et al. |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0149986 A1 | 8/2003 | Mayfield et al. |
| 2003/0153308 A1 | 8/2003 | Karabinis |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192395 A1 | 9/2004 | Karabinis |
| 2004/0203393 A1 | 10/2004 | Chen |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1* | 10/2005 | Levin et al. ................. 455/431 |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0040657 A1 | 2/2006 | Karabinis et al. |
| 2006/0040659 A1 | 2/2006 | Karabinis |
| 2006/0094352 A1 | 5/2006 | Karabinis |
| 2006/0094420 A1 | 5/2006 | Karabinis |
| 2006/0105707 A1 | 5/2006 | Karabinis |
| 2006/0111041 A1 | 5/2006 | Karabinis |
| 2006/0111056 A1 | 5/2006 | Dutta |
| 2006/0135058 A1 | 6/2006 | Karabinis |
| 2006/0135060 A1 | 6/2006 | Karabinis |
| 2006/0135070 A1 | 6/2006 | Karabinis |
| 2006/0165120 A1 | 7/2006 | Karabinis |
| 2006/0189274 A1 | 8/2006 | Karabinis |
| 2006/0189275 A1 | 8/2006 | Karabinis |
| 2006/0189309 A1 | 8/2006 | Good et al. |
| 2006/0194576 A1 | 8/2006 | Karabinis et al. |
| 2006/0205346 A1 | 9/2006 | Evans et al. |
| 2006/0205347 A1 | 9/2006 | Karabinis |
| 2006/0205367 A1 | 9/2006 | Karabinis |
| 2006/0211371 A1 | 9/2006 | Karabinis et al. |
| 2006/0211419 A1 | 9/2006 | Karabinis |
| 2006/0211452 A1 | 9/2006 | Karabinis |
| 2006/0217070 A1 | 9/2006 | Karabinis |
| 2006/0232465 A1 | 10/2006 | Levin et al. |
| 2006/0233147 A1 | 10/2006 | Karabinis |
| 2006/0246838 A1 | 11/2006 | Karabinis |
| 2006/0252368 A1 | 11/2006 | Karabinis |
| 2006/0276129 A1 | 12/2006 | Karabinis |
| 2006/0292990 A1 | 12/2006 | Karabinis et al. |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0026867 A1 | 2/2007 | Karabinis |
| 2007/0037514 A1 | 2/2007 | Karabinis |
| 2007/0072545 A1 | 3/2007 | Karabinis et al. |
| 2007/0087690 A1 | 4/2007 | Karabinis |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0135051 A1 | 6/2007 | Zheng et al. |
| 2007/0149127 A1 | 6/2007 | Karabinis |
| 2007/0184849 A1 | 8/2007 | Zheng |
| 2007/0192805 A1 | 8/2007 | Dutta et al. |
| 2007/0202816 A1 | 8/2007 | Zheng |
| 2007/0232298 A1 | 10/2007 | Karabinis |
| 2007/0233383 A1 | 10/2007 | Churan |
| 2007/0243866 A1 | 10/2007 | Karabinis |

| | | |
|---|---|---|
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0032690 A1 | 2/2008 | Karabinis |
| 2008/0113666 A1 | 5/2008 | Monte et al. |
| 2008/0119190 A1 | 5/2008 | Karabinis |

FOREIGN PATENT DOCUMENTS

| | | |
|---|---|---|
| EP | 0 506 255 A3 | 9/1992 |
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 01/54314 A1 | 7/2001 |
| WO | WO 2004/114547 A1 | 12/2004 |

OTHER PUBLICATIONS

International Search Report and Written Opinion (14 pages) corresponding to International Application No. PCT/US2008/007885; Mailing Date: Nov. 14, 2008.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

Karabinis, "Maximum-Power and Amplitude-Equalizing Algorithms for Phase Control in Space Diversity Combining", *The Bell System Technical Journal*, vol. 62, No. 1; Jan. 1983.

\* cited by examiner

US 8,064,824 B2

SYSTEMS AND METHODS FOR REDUCING POWER ROBBING IMPACT OF INTERFERENCE TO A SATELLITE

CROSS REFERENCE TO RELATED APPLICATION

The present application claims the benefit of and priority to U.S. Provisional Patent Application No. 60/947,778, filed Jul. 3, 2007, entitled "Systems And Methods For Reducing Power Robbing Impact Of Interference To A Satellite," the disclosure of which is hereby incorporated herein by reference in its entirety.

FIELD OF THE INVENTION

This invention relates to wireless communications systems, methods and components thereof and more particularly to satellite wireless communications systems, methods and components thereof.

BACKGROUND

Satellite radioterminal communications systems and methods are widely used for radioterminal communications. Satellite radioterminal communications systems and methods generally employ at least one space-based component, such as one or more satellites, that is/are configured to wirelessly communicate with a plurality of satellite radioterminals.

A satellite radioterminal communications system or method may utilize a single satellite antenna pattern (beam or cell) covering an entire service region served by the system. Alternatively or in combination with the above, in cellular satellite radioterminal communications systems and methods, multiple satellite antenna patterns (beams or cells) are provided, each of which can serve a substantially distinct service region in an overall service region, to collectively provide service to the overall service region. Thus, a cellular architecture that is similar to that used in conventional terrestrial cellular radioterminal systems and methods can be implemented in cellular satellite-based systems and methods. The satellite typically communicates with radioterminals over a bidirectional communications pathway, with radioterminal communications signals being communicated from the satellite to the radioterminal over a downlink or forward link (also referred to as forward service link), and from the radioterminal to the satellite over an uplink or return link (also referred to as return service link). In some cases, such as, for example, in broadcasting, the satellite may communicate information to one or more radioterminals unidirectionally.

The overall design and operation of cellular satellite radioterminal systems and methods are well known to those having skill in the art, and need not be described further herein. Moreover, as used herein, the term "radioterminal" includes cellular and/or satellite radiotelephones with or without a multi-line display; Personal Communications System (PCS) terminals that may combine a radioterminal with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radioterminal also may be referred to herein as a "radiotelephone," a "mobile terminal," a "user device," a "wireless transmitter," a "wireless receiver," a "transceiver" or simply as a "terminal". As used herein, the term(s) "radioterminal," "radiotelephone," "mobile terminal," "user device," "wireless transmitter," "wireless receiver," "transceiver" and/or "terminal" also include(s) any other radiating user device, equipment and/or source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude.

The above description has focused on communications between the satellite and the radioterminals. However, cellular satellite communications systems and methods also generally employ a bidirectional feeder link for communications between one or more satellite gateway(s) and the satellite(s). The bidirectional feeder link includes a forward feeder link from the gateway(s) to the satellite(s) and a return feeder link from the satellite(s) to the gateway(s). The forward feeder link and the return feeder link each uses one or more carriers.

A satellite generally includes at least one feeder link amplifier that is used to amplify a return feeder link signal prior to transmitting the return feeder link signal from the satellite to the satellite gateway(s). The satellite may also inadvertently receive a level of interference, over its return service links, from emissions of one or more terrestrial networks and/or satellite terminals of other operators (e.g., Inmarsat), and the satellite may not be configured to separate and/or discard the level of interference. Thus, the satellite may inadvertently form a return feeder link signal that includes at least some of the level of interference as well as one or more desired signals.

The feeder link amplifier may be operatively configured to not exceed a maximum level of output power in order to, for example, maintain a desired level of linearity. As such, as the level of interference increases, an amount of amplification applied to a desired signal may be reduced. This reduction is referred to as "power robbing."

Power robbing may be reduced by increasing a capability (e.g., size) of the feeder link amplifier to accommodate a desired level of amplification of one or more desired signals along with the level of interference while maintaining a desired level of linearity. Unfortunately, an increased capability amplifier (e.g., a larger amplifier) may undesirably increase cost, power consumption and/or weight of a satellite. Power robbing also may be decreased by increasing an aperture of the satellite's feeder link antenna(s). However, increasing the aperture of the satellite's feeder link antenna(s) may also undesirably increase the size, cost and/or weight of the satellite.

SUMMARY

Some embodiments provide methods of processing return feeder link signals at a satellite gateway including a plurality of spatially diverse receive antennas. The methods include receiving respective return feeder link signals at each of the plurality of receive antennas, and selectively adjusting amplitudes and/or phases of a plurality of the return feeder link signals received at the plurality of receive antennas in response to amplitude/phase adjustment settings to provide a plurality of adjusted return feeder link signals. The plurality of adjusted feeder link signals are combined to generate a combined return feeder link signal, and periodic amplitude variation in the combined return feeder link signal is detected. The amplitude/phase adjustment settings are configured in response to the combined return feeder link signal to reduce periodic amplitude variation in the combined return feeder link signal.

Configuring the amplitude/phase adjustment settings may include providing non-periodic phase adjustment signals to a plurality of amplitude/phase adjustors that process the plurality of return feeder link signals.

Selectively adjusting amplitudes and/or phases of the return feeder link signals may include adjusting the amplitude/phase of a first one of the return feeder link signals at a first adjustment frequency and adjusting the amplitude/phase of a second one of the return feeder link signals at a second adjustment frequency that is different from the first adjustment frequency. The first adjustment frequency may be 10 Hz and the second adjustment frequency may be 50 Hz.

The methods may further include adjusting amplitudes/phases of the first and second return feeder link signals using respective first and second periodic functions that are in phase quadrature therebetween. The first and second periodic functions may include sinusoidal functions.

The plurality of receive antennas may include four antennas, and the methods may further include receiving first, second, third and fourth return feeder link signals at respective ones of the plurality of receive antennas, selectively adjusting amplitudes and/or phases of the first and second return feeder link signals received at the first and second receive antennas to generate respective first and second adjusted feeder link signals, combining the first adjusted feeder link signal and the third return feeder link signal to generate a first intermediate combined signal, combining the second adjusted feeder link signal and the fourth return feeder link signal to generate a second intermediate combined signal, and combining the first intermediate combined signal and the second intermediate combined signal to generate the combined return feeder link signal.

The methods may further include adjusting an amplitude and/or phase of the first intermediate combined signal to generate an adjusted intermediate combined signal, and combining the first intermediate combined signal and the second intermediate combined signal may include combining the adjusted intermediate combined signal and the second intermediate combined signal.

The plurality of receive antennas may include four antennas, and the methods may further include receiving first, second, third and fourth return feeder link signals at respective ones of the plurality of receive antennas, selectively adjusting amplitudes and/or phases of the first, second and third return feeder link signals received at the first, second and third receive antennas to generate respective first, second and third adjusted feeder link signals, and combining the first, second and third adjusted feeder link signals and the fourth return feeder link signal to generate the combined return feeder link signal.

Combining the plurality of adjusted feeder link signals to generate a combined return feeder link signal may include RF combining the signals. In some embodiments, the methods may further include converting the feeder link signals to an intermediate frequency, and combining the plurality of adjusted feeder link signals to generate a combined return feeder link signal may include combining intermediate frequency signals. In some embodiments, the methods may further include converting the combined return feeder link signal to baseband, and combining the baseband combined return feeder link signal with another baseband signal.

A satellite gateway according to some embodiments includes a plurality of receive antennas, and a processor coupled to the plurality of receive antennas and configured to receive respective return feeder link signals from each of the plurality of receive antennas. The processor is further configured to selectively adjust amplitudes and/or phases of a plurality of the return feeder link signals received at the plurality of receive antennas in response to amplitude/phase adjustment settings to provide a plurality of adjusted return feeder link signals, and to combine the plurality of adjusted feeder link signals to generate a combined return feeder link signal.

The processor may include a control circuit configured to detect periodic amplitude variation in the combined return feeder link signal, and to configure the amplitude/phase adjustment settings in response to periodic amplitude variation in the combined return feeder link signal to reduce periodic amplitude variation in the combined return feeder link signal.

The control circuit may be configured to provide non-periodic phase adjustment signals to a plurality of amplitude/phase adjustors that process the plurality of return feeder link signals.

The processor may include a first amplitude/phase adjustor that is configured to selectively adjust the amplitude/phase of a first one of the return feeder link signals at a first adjustment frequency and a second amplitude/phase adjustor that is configured to selectively adjust the amplitude/phase of a second one of the return feeder link signals at a second adjustment frequency that is different from the first adjustment frequency.

The first amplitude/phase adjustor and the second amplitude/phase adjustor may adjust amplitudes/phases of the first and second return feeder link signals using respective first and second periodic functions that are in phase quadrature therebetween. The first and second periodic functions include sinusoidal functions.

The plurality of receive antennas may include four antennas, and the processor may further include a first amplitude/phase adjustor configured to selectively adjust amplitude/phase of a first return feeder link signal, a second amplitude/phase adjustor configured to selectively adjust amplitude/phase of a second return feeder link signal, a first combiner configured to combine the first return feeder link signal and a third return feeder link signal to form a first intermediate combined signal, a second combiner configured to combine the second return feeder link signal and a fourth return feeder link signal to form a second intermediate combined signal, and a third combiner configured to combine the first intermediate combined signal and the second intermediate combined signal to generate a combined return feeder link signal.

The processor may further include a third amplitude/phase adjustor configured to selectively adjust amplitude/phase of the first intermediate combined signal to generate an adjusted intermediate combined signal. The third combiner may be configured to combine the adjusted intermediate combined signal and the second intermediate combined signal.

The plurality of receive antennas may include four antennas, and the processor may further include a first amplitude/phase adjustor configured to selectively adjust amplitude/phase of a first return feeder link signal, a second amplitude/phase adjustor configured to selectively adjust amplitude/phase of a second return feeder link signal, a third amplitude/phase adjustor configured to selectively adjust amplitude/phase of a third return feeder link signal, and a combiner configured to combine the first return feeder link signal, the second return feeder link signal, the third return feeder link signal and a fourth return feeder link signal to form the combined return feeder link signal.

Methods of processing return feeder link signals at a satellite gateway including a first and second receive antennas according to further embodiments include receiving first and second return feeder link signals at the first and second receive antennas, respectively, modulating a phase of the first return feeder link signal to form an adjusted first feeder link signal, combining the adjusted first feeder link signal with the second return feeder link signal to form a combined feeder link signal, detecting periodic amplitude variation in the combined feeder link signal, and shifting a phase of the first return feeder link signal to reduce periodic amplitude variation in the combined feeder link signal.

The methods may further include receiving third and fourth return feeder link signals at respective third and fourth receive antennas, modulating a phase of the third return feeder link signal to form an adjusted third feeder link signal, combining the adjusted third feeder link signal with the fourth return feeder link signal to form a second combined feeder link signal, detecting periodic amplitude variation in the second combined feeder link signal, and shifting a phase of the third return feeder link signal to reduce periodic amplitude variation in the second combined feeder link signal.

The methods may further include modulating a phase of the combined feeder link signal to form an adjusted combined feeder link signal, combining the adjusted combined feeder link signal with the second combined feeder link signal to form a third combined feeder link signal, detecting periodic amplitude variation in the third combined feeder link signal, and shifting a phase of the combined feeder link signal to reduce periodic amplitude variation in the third combined feeder link signal.

In some embodiments, the methods may further include receiving third and fourth return feeder link signals at respective third and fourth receive antennas, and modulating phases of the third and fourth return feeder link signals to form an adjusted third feeder link signal and an adjusted third feeder link signal. Combining the adjusted first feeder link signal with the second return feeder link signal to form the combined feeder link signal may include combining the adjusted first feeder link signal, the second return feeder link signal, the adjusted third feeder link signal and the adjusted fourth feeder link signal to form the combined feeder link signal.

A satellite gateway according to further embodiments includes a processor configured to receive first and second return feeder link signals from first and second receive antennas, respectively, a phase modulator configured to modulate a phase of the first return feeder link signal, a phase shifter configured to shift a phase of the first return feeder link signal by a phase delay, a combiner configured to combine the first return feeder link signal with the second return feeder link signal to form a combined feeder link signal, a power detector configured to detect periodic amplitude variation in the combined feeder link signal, and a feedback loop from the power detector to the phase shifter configured to adjust the phase delay to reduce periodic amplitude variation in the combined feeder link signal.

The processor may be further configured to receive third and fourth return feeder link signals from respective third and fourth receive antennas, and the processor may further include a second phase modulator configured to modulate a phase of the third return feeder link signal, a second phase shifter configured to shift a phase of the third return feeder link signal by a second phase delay, a second combiner configured to combine the third return feeder link signal with the fourth return feeder link signal to form a second combined feeder link signal, a second power detector configured to detect periodic amplitude variation in the second combined feeder link signal, and a second feedback loop from the second power detector to the second phase shifter configured to adjust the second phase delay to reduce periodic amplitude variation in the second combined feeder link signal.

The satellite gateway may further include a third phase modulator configured to modulate a phase of the combined feeder link signal, a third phase shifter configured to shift a phase of the third combined feeder link signal by a third phase delay, a third combiner configured to combine the combined feeder link signal with the second combined feeder link signal to form a third combined feeder link signal, a third power detector configured to detect periodic amplitude variation in the third combined feeder link signal, and a third feedback loop from the third power detector to the third phase shifter configured to adjust the third phase delay to reduce periodic amplitude variation in the third combined feeder link signal.

The processor may be further configured to receive third and fourth return feeder link signals from respective third and fourth receive antennas, and the processor may further include a second phase modulator configured to modulate a phase of the third return feeder link signal, a second phase shifter configured to shift a phase of the third return feeder link signal by a second phase delay, a third phase modulator configured to modulate a phase of the fourth return feeder link signal, and a third phase shifter configured to shift a phase of the fourth return feeder link signal by a third phase delay. The combiner may be configured to combine the first, second, third and fourth return feeder link signals to form the combined feeder link signal.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Figure 1:
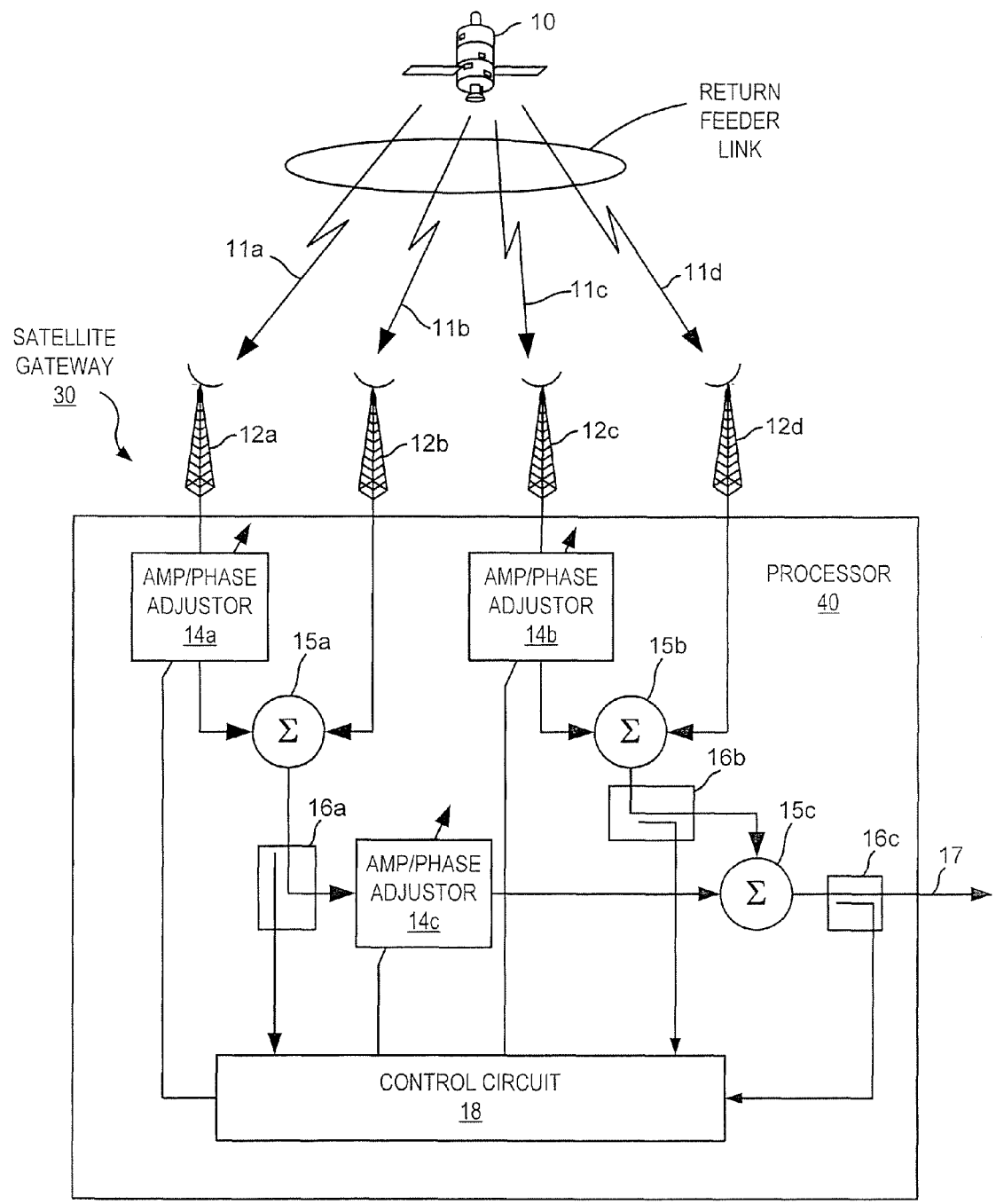
FIGS. 1, 2, 3, 4, 5A and 5B are block diagrams illustrating systems/methods according to some embodiments.

Specific embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. The symbol "/" is also used as a shorthand notation for "and/or".

Embodiments of the present invention will be described herein in connection with potential interference that may be caused by components of a first wireless communications system (e.g., a first satellite radioterminal communications system and/or a first terrestrial wireless communications system) to components of the first and/or a second wireless communications system (e.g., the first and/or a second satellite radioterminal communications system), and solutions to reduce or eliminate this potential interference. In some embodiments, the first satellite radioterminal communications system may be a satellite radioterminal communications system that is operated by Mobile Satellite Ventures, LP ("MSV") and the second satellite radioterminal communications system may be an Inmarsat system. However, other first and second radioterminal communications systems may be provided according to other embodiments of the present invention. It will be understood that two or more embodiments of the present invention as presented herein may be combined in whole or in part to form one or more additional embodiments.

FIG. 1 illustrates systems and/or methods for reducing a power robbing effect of interference that may be experienced on a return feeder link by a satellite system including one or more satellites 10. As shown in FIG. 1, a satellite gateway 30 is configured with a plurality of feeder link antennas 12a-12d. Each one of the feeder link antennas 12a-12d of the satellite gateway 30 is configured to receive a respective return feeder link signal 11a-11d and to provide the respective return feeder link signal 11a-11d to a processor 40. The processor 40 may include general purpose and/or special purpose hardware and/or software and may be centralized or distributed. Furthermore, the antennas 12a-12d may be located near or remote from the processing hardware of the satellite gateway 30.

The processor 40 is configured to selectively adjust, in amplitude and/or phase, one or more of the return feeder link signals that are provided to the processor 40 by the respective feeder link antennas 12a-12d and, following the selective adjustment(s), to combine the feeder link signals, using one or more summing nodes 15a-c, to form a combined feeder link signal 17. The selective adjustment(s) in amplitude and/or phase provided by processor 40 using amplitude/phase adjustors 14a, 14b and 14c may, according to some embodiments, be phase adjustments wherein a phase adjustment may include a periodic phase adjustment and a non-periodic phase adjustment, as described in Karabinis "*Maximum-Power and Amplitude-Equalizing Algorithms for Phase Control in Space Diversity Combining*," The Bell System Technical Journal, January 1983, Vol. 62, No. 1, Part 1 (pages 63-89), referred to as the "BSTJ Article," which is incorporated herein by reference.

The techniques described in the BSTJ Article were developed, and have been used, to combat multipath fading in wireless communications systems. Multipath fading occurs most often in non-line of sight communications systems, and arises from the fact that a transmitted signal can follow more than one path to the receiver, due to reflections from man-made features, such as buildings, bridges, etc., and/or natural environmental features, such as hills, mountains, trees, etc. Multipath fading is sometimes referred to as Rayleigh fading. Rayleigh fading with a strong line of sight component is said to be Rician fading.

Each path from the transmitter to the receiver can have a different path length, resulting in different propagation delays/phase shifts for signals propagated over different paths. Signals received over various paths can therefore combine destructively at the receiver, potentially resulting in a severe loss of signal strength at the receiver. Multipath fading can be a particular problem when the receiver is mobile, as the various propagation paths can change dynamically.

However, multipath fading is not typically a concern for satellite feeder link signals, because the satellite feeder link signal is transmitted over a relatively narrow line of sight beam in which both the satellite and the gateway (or ground station) employ highly directional antennas. That is, satellite feeder link signals are generally characterized by having a single main path directly between the satellite and the gateway. Ancillary paths are generally either nonexistent or not significant. Accordingly, techniques such as those described in the BSTJ Article that are designed to address multipath fading have not been used to process return feeder link signals in satellite gateways.

The feeder link signal is subject to rain fading, however. Rain fading occurs when there is heavy rainfall over the gateway, which attenuates the feeder link signal and makes demodulation of the signal difficult or impossible. System operators have attempted to address rain fading by using feeder link space diversity switching. In feeder link space diversity switching, at least first and second spatially distant feeder link antennas are used to provide respective first and second feeder link signals to a satellite gateway. However, the first and second feeder link signals are generally not combined. Instead, either the first or the second signal is chosen for demodulation, depending on a signal strength threshold/criterion, and the selected signal is provided to the satellite gateway for further processing and demodulation. In feeder link diversity switching, the first and second feeder link antennas are typically spaced far enough apart that it is statistically unlikely that a significant rain event will occur at the same time in both places. This typically leads to the antennas being placed hundreds of miles apart.

In contrast, some embodiments provide a satellite feeder link receiver that employs antennas that can be located relatively close together (i.e., much closer together than is required for space diversity switching) and combines the signals received at the antennas to combat not multipath fading, but the effects of power robbing at the satellite.

Continuing the discussion of FIG. 1, three amplitude/phase adjustors 14a-14c are shown, compared to the single amplitude/phase adjustor shown in the BSTJ Article, wherein only two antennas are used. Each one of the amplitude/phase adjustors 14a-14c may be configured to adjust using a different adjustment frequency. A frequency associated with an adjustment performed by amplitude/phase adjustor 14a may, for example, be at a rate of 10 Hz, whereas frequencies associated with adjustments performed by amplitude/phase adjustors 14b and 14c may, for example, be at rates 50 Hz and 30 Hz, respectively. In some embodiments, first and second amplitude/phase adjustors such as, for example, amplitude/phase adjustors 14a and 14b respectively, may be configured to provide respective first and second periodic phase adjustments, at respective first and second frequencies, using respective first and second periodic functions that are in phase quadrature therebetween. In some embodiments, the first and second periodic functions may be sinusoidal functions or approximately sinusoidal functions. In some embodiments, the first frequency may be equal or approximately equal to the second frequency.

The control circuit 18 is configured to detect, via signal couplers 16a, 16b and 16c, periodic amplitude variations corresponding to respective periodic phase variations that are imposed on respective combined signals by respective amplitude/phase adjustors 14a, 14b and 14c. The control circuit 18 is also configured to reduce, and in some embodiments, minimize, the detected periodic amplitude variations by providing respective non-periodic phase adjustment signals to the respective amplitude/phase adjustors 14a, 14b and 14c. As is shown in the BSTJ Article, when two signals are combined in substantial phase alignment to form a combined signal, thus maximizing received signal power, an amplitude variation in the combined signal due to a phase variation in one of the two signals is reduced and/or minimized.

In the architecture of FIG. 1, the frequency of the periodic phase adjustment at the amplitude/phase adjustor 14a may be the same or different to that of the amplitude/phase adjustor 14b. However, the frequency of the periodic phase adjustment at the amplitude/phase adjustor 14c may differ from that of both the amplitude/phase adjustor 14a and the amplitude/phase adjustor 14b so that the control circuit 18 can un-ambiguously detect the amplitude variation resulting from the phase variation imposed at the amplitude/phase adjustor 14c, and can disregard any residual amplitude variation due to phase variations at the amplitude/phase adjustor 14a and/or the amplitude/phase adjustor 14b when doing so.

First and second return feeder link signals are received by the antennas 12a and 12b, respectively. The first return feeder link signal received by the antenna 12a is adjusted by the amplitude/phase adjustor 14a using periodic and non-periodic phase adjustment signals based on settings provided by the control circuit 18. The adjusted first return feeder link signal is then combined at a first summing node 15a with the second return feeder link signal to form a first intermediate combined signal. The amplitude/phase adjustor 14a adjusts a phase of the first return feeder link signal in response to a detected amplitude variation in the first intermediate combined signal in an attempt to increase or maximize the received signal power of the first intermediate combined signal.

Third and fourth return feeder link signals are received by the antennas 12c and 12d, respectively. The third return feeder link signal received by the antenna 12c is adjusted by the amplitude/phase adjustor 14b using periodic and non-periodic phase adjustment signals based on settings provided by the control circuit 18. The adjusted third return feeder link signal is then combined at a second summing node 15b with the fourth return feeder link signal to form a second intermediate combined signal. The amplitude/phase adjustor 14b adjusts a phase of the third return feeder link signal in response to a detected amplitude variation in the second intermediate combined signal in an attempt to increase or maximize the received signal power of the second intermediate combined signal.

The phase of the first intermediate combined signal is adjusted by a third amplitude/phase adjustor 14c, and the phase-adjusted first intermediate combined signal is combined at a third summing node 15c with the second intermediate combined signal to form a combined output signal 17. The amplitude/phase adjustor 14c adjusts a phase of the first intermediate combined signal in response to a detected amplitude variation in the combined output signal in an attempt to increase or maximize the received signal power of the combined output signal. The combined output signal can then be further processed by the processor 40. For example, the combined output signal can be demodulated and the information therein can be detected.

It will be understood that at least some of the feeder link antennas 12a-12d illustrated in FIG. 1 may be co-located, substantially co-located or spaced apart therebetween. The feeder link antennas 12a-12d can be located much closer together than antennas used for space diversity switching. For example, the feeder link antennas 12a-12d can be less than 1 km apart, and in some embodiments less than 100 m apart.

It will also be understood that the systems/methods illustrated in FIG. 1 are not limited to four antennas but fewer or more than four antennas may be used and that the antennas used may be identical, substantially identical or different therebetween. Using four identical or substantially identical antennas 12a-12d (each including identical or substantially identical front-end circuitry) can yield a 6 dB (or approximately a 6 dB) increase in signal-to-noise ratio at output signal 17 compared to signal 17 having been derived from a system using only one antenna (e.g., only antenna 12a). Accordingly, the power robbing effect of interference may be reduced by 6 dB (or approximately by 6 dB).

Figure 2:
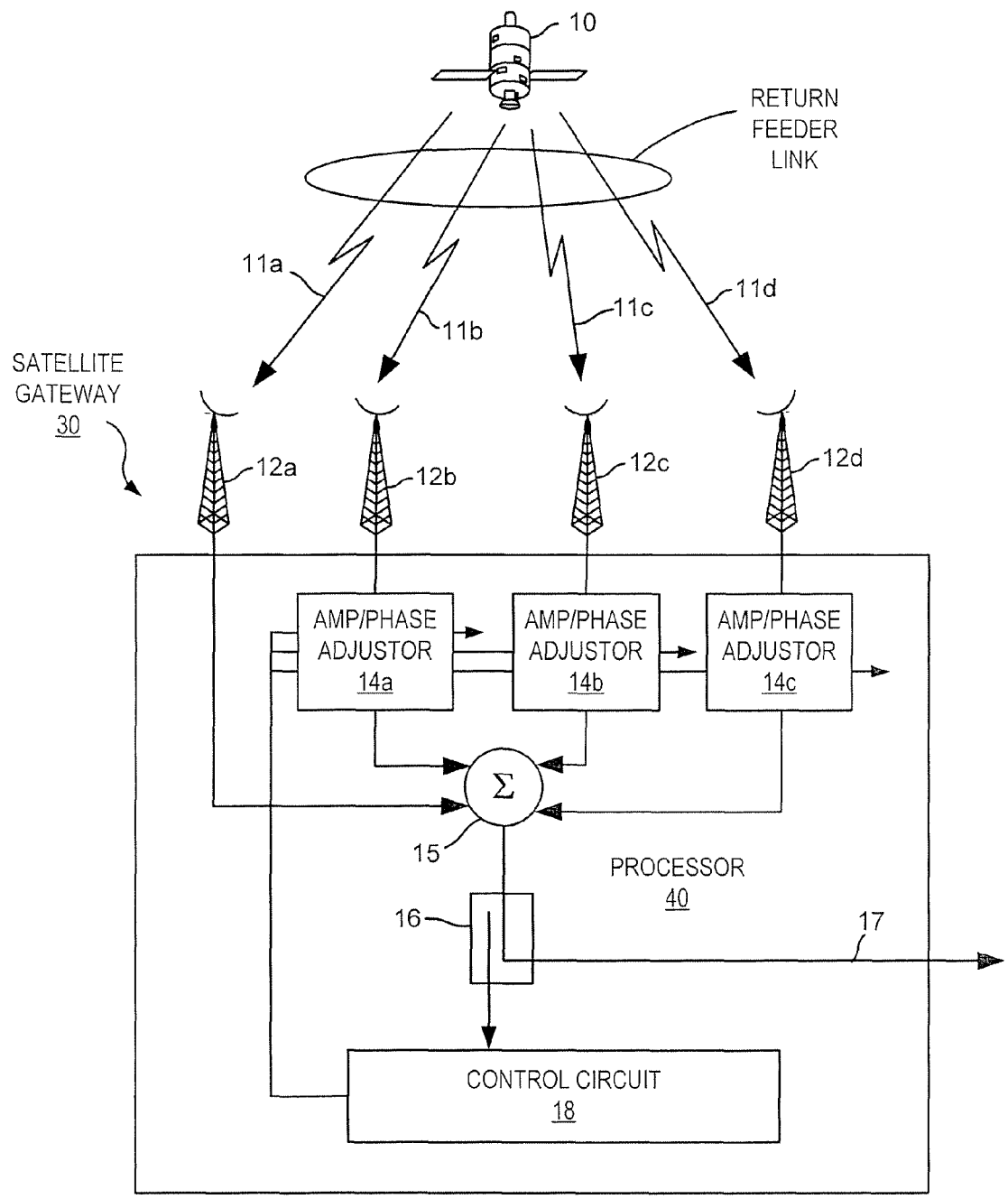

FIG. 2 illustrates an alternate configuration of systems/methods for reducing or eliminating the power robbing effect of interference. The principles remain as described above relative to FIG. 1. However, the amplitude/phase adjustors 14a-14c are arranged differently and only a single summing node 15 and a single signal coupler 16 need be used. In particular, three of the four received signals are adjusted by the amplitude/phase adjustors 14a-14c based on respective amplitude/phase adjustment settings in response to detected periodic amplitude variation in the combined signal output by the summing node 15. The amplitudes/phases of the three received signals are adjusted to increase the signal power of the combined signal output by the summing node 15. Many other variations will be apparent to those having skill in the art.

In the architecture of FIG. 2, given that a detection of amplitude variation occurs at a common point in the control circuit 18 in response to a signal received from the signal coupler 16, phase variations of different frequencies may be imposed at the amplitude/phase adjustors 14a, 14b and 14c in order to enable the signal coupler 16 and the control circuit 18 to un-ambiguously detect the respective amplitude variations and to adjust each one individually by imposing appropriate (non-periodic) phase adjustments at the amplitude/phase adjustors 14a, 14b and 14c.

Figure 3:
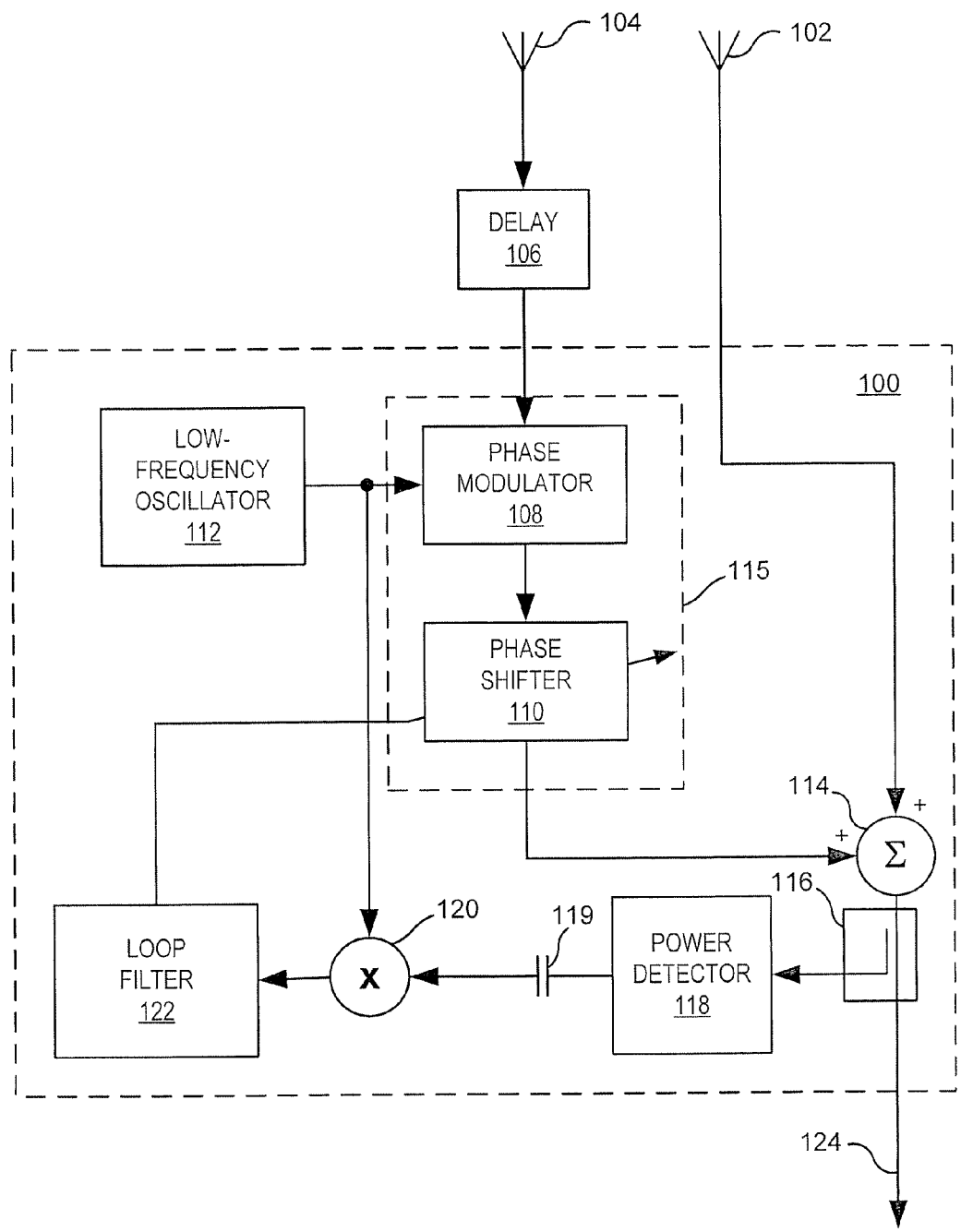

FIG. 3 illustrates a combiner configured to perform periodic phase adjustment and non-periodic phase adjustment of a diversity signal received using two antennas. As shown therein, a continuous combiner 100 (analogous to the processor 40 of the embodiments of FIGS. 1 and 2) receives input signals from a main antenna 102 and a diversity antenna 104. The signal received over the diversity antenna 104 is subjected to a fixed delay 106 that equalizes the electrical path length leading to the inputs of the combiner 100.

The signal received via the main antenna 102 is fed into a summing node 114 and is added to an adjusted version of the signal received over the diversity antenna 104 to produce a combined output signal 124. In particular, the signal received over the diversity antenna 104 is adjusted by an amplitude/phase adjustor 115 including at least a phase modulator 108 and a phase shifter 110. The phase modulator 108 provides the periodic phase adjustment described above, while the phase shifter 110 provides the non-periodic phase adjustment discussed above. In the frequency domain, the phase modulator multiplies the received diversity signal by a term having a sinusoidal phase, e.g., $e^{j\alpha \sin \omega_m t}$, while the phase shifter multiplies the received signal by a term having a fixed phase delay, e.g., $e^{j\Theta}$.

A low frequency oscillator 112 provides a low-frequency sinusoidal signal at a frequency $\omega_m$ that is used by the phase modulator 108 to modulate the phase of the diversity signal. A power detector 118 receives the output signal via a signal coupler 116, and responsively outputs a power detection signal. It will be appreciated that in a communication signal, power is related to the amplitude of the signal. Thus, the power detection signal provides a measure of the amplitude of the combined signal. The power detection signal is passed through a high pass filter (such as a capacitor) 119 and is mixed with the low-frequency sinusoid output by the low-frequency oscillator 112, and the result is filtered with a loop filter 122. The loop filter 122 can include a low-pass filter, an integrator and an amplifier. The output of the loop filter 122 controls the phase shifter 110 to vary the non-periodic phase adjustment by the phase shifter 110 until periodic amplitude variation in the combined signal in response to the periodic phase adjustment is minimized or otherwise reduced to a desired level.

In some embodiments, the phase of the received diversity signal is dynamically adjusted so as to always maintain a desired relationship with respect to the main antenna signal phase at the summing node 114. For the purpose of generating a phase-control signal, the phase of the diversity antenna signal is perturbed sinusoidally, resulting in a periodic modulation of the power of the combined signal 124. The fundamental component of the combined signal power modulation is detected by the power detector 118 and used in a feedback arrangement to control the phase delay θ of the phase shifter 110. Depending on the phase control algorithm used, the phase correction can be chosen to attempt to maximize the average combined signal power or to minimize the dispersion of the combined signal.

Figure 4:
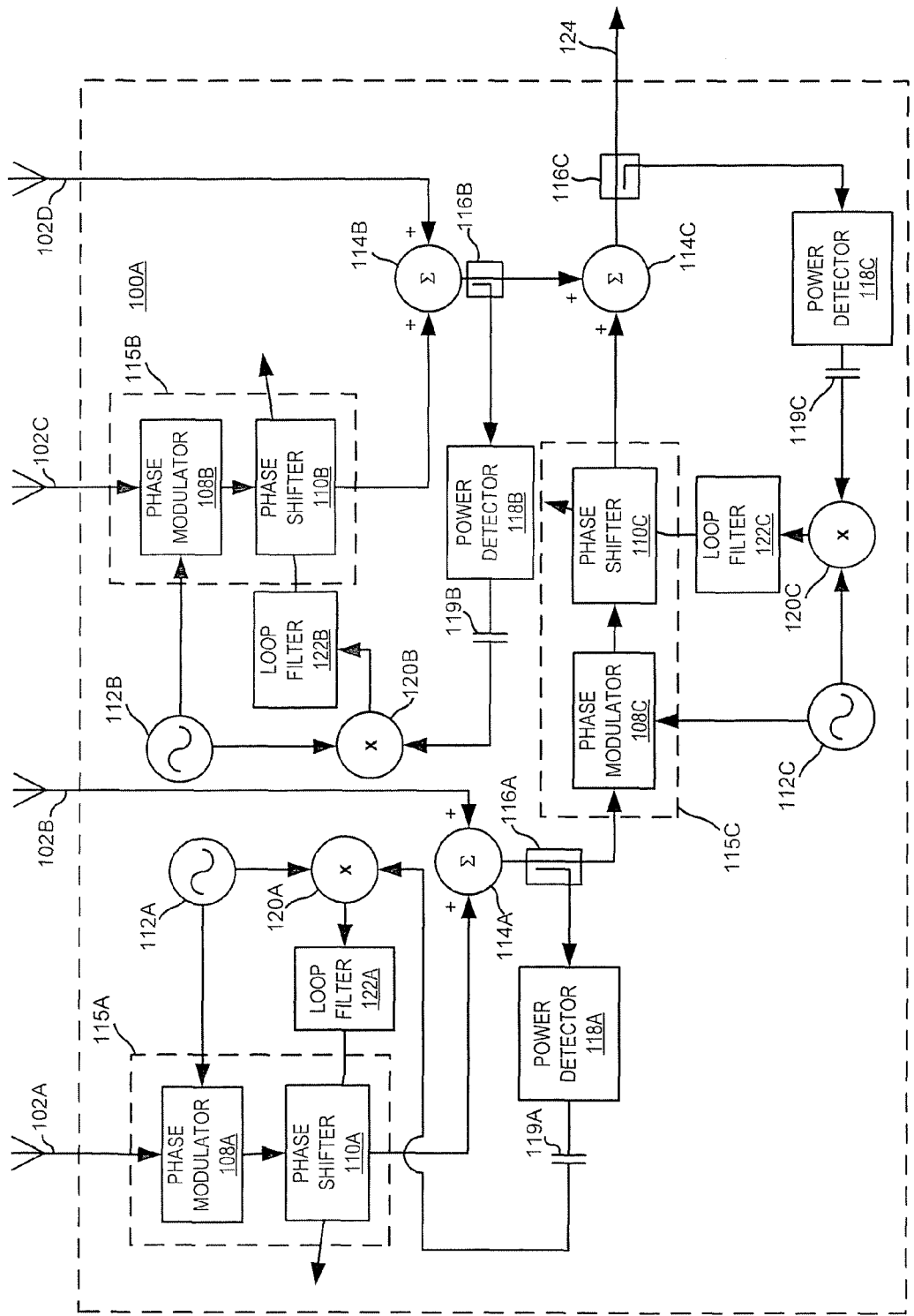

FIG. 4 illustrates a combiner 100A configured to perform periodic phase adjustment and non-periodic phase adjustment of a diversity signal received using four antennas, as illustrated in FIG. 1. Referring to FIG. 4, a continuous combiner 100A (analogous to the processor 40 of the embodiments of FIG. 1) receives input signals from four antennas 102A to 102D. Although not illustrated in FIG. 4, the signals received over one or more of the antennas 102A to 102D can be subjected to a fixed delay that equalizes the electrical path length leading to the inputs of the combiner 100A.

The first input signal received over the first antenna 102A is adjusted by a first amplitude/phase adjustor 115A including at least a first phase modulator 108A and a first phase shifter 110A. The first amplitude/phase adjustor 115A adjusts the first input signal and outputs an adjusted signal.

A first low frequency oscillator 112A provides a low-frequency sinusoidal signal at a first adjustment frequency $\omega_{m1}$ that is used by the first phase modulator 108A to modulate the phase of the input signal. The first adjustment frequency $\omega_{m1}$ may be, for example, 10 Hz.

The second input signal received via the second antenna 102B is fed into a first summing node 114A, where it is added to the adjusted signal output by the first amplitude/phase adjustor 115A to generate a first intermediate output signal.

A first power detector 118A receives the first intermediate output signal via a first signal coupler 116A, and responsively outputs a power detection signal. The power detection signal is passed through a first high pass filter (such as a capacitor) 119A and is mixed with the low-frequency sinusoid output by the first low-frequency oscillator 112A, and the result is filtered with a first loop filter 122A, the output of which controls the first phase shifter 110A to vary the non-periodic phase adjustment by the first phase shifter 110A until periodic amplitude variation in the first intermediate output signal in response to the periodic phase adjustment is minimized or otherwise reduced to a desired level.

The third input signal received over the third antenna 102C is adjusted by a second amplitude/phase adjustor 115B including at least a second phase modulator 108B and a second phase shifter 110B. The second amplitude/phase adjustor 115B adjusts the third input signal and outputs an adjusted signal.

A second low frequency oscillator 112B provides a low-frequency sinusoidal signal at a frequency $\omega_{m2}$ that is used by the second phase modulator 108A to modulate the phase of the input signal. The second adjustment frequency $\omega_{m2}$ may be the same frequency as the first adjustment frequency $\omega_{m1}$, for example, 10 Hz. In some embodiments, the second adjustment frequency $\omega_{m2}$ may be different from the first adjustment frequency $\omega_{m1}$.

The fourth input signal received via the fourth antenna 102D is fed into a second summing node 114B, where it is added to the adjusted signal output by the second amplitude/phase adjustor 115B to generate a second intermediate output signal.

A second power detector 118B receives the second intermediate output signal via a second signal coupler 116B, and responsively outputs a power detection signal. The power detection signal is passed through a second high pass filter (such as a capacitor) 119B and is mixed with the low-frequency sinusoid output by the second low-frequency oscillator 112B, and the result is filtered with a second loop filter 122B, the output of which controls the second phase shifter 110B to vary the non-periodic phase adjustment by the phase shifter 110B until periodic amplitude variation in the second intermediate output signal in response to the periodic phase adjustment is minimized or otherwise reduced to a desired level.

The first intermediate output signal output by the first summing node 114A is adjusted by a third amplitude/phase adjustor 115C including at least a third phase modulator 108C and a third phase shifter 110C.

A third low frequency oscillator 112C provides a low-frequency sinusoidal signal at a third adjustment frequency $\omega_{m3}$ that is used by the third phase modulator 108C to modulate the phase of the signal. The third adjustment frequency $\omega_{m3}$ may be a different frequency from the first and second adjustment frequencies $\omega_{m1}$ and $\omega_{m1}$, and may be, for example, 100 Hz.

The second intermediate output signal output by the second summing node 114B is fed into a third summing node 114C, where it is added to the signal output by the third amplitude/phase adjustor 115C to generate a combined output signal 124.

A third power detector 118C receives the combined output signal 124 via a third signal coupler 116C, and responsively outputs a power detection signal. The power detection signal is passed through a third high pass filter (such as a capacitor) 119C and is mixed with the low-frequency sinusoid output by the third low-frequency oscillator 112C, and the result is filtered with a third loop filter 122C, the output of which controls the third phase shifter 110C to vary the non-periodic phase adjustment by the third phase shifter 110C until periodic amplitude variation in the combined output signal 124 in response to the periodic phase adjustment is minimized or otherwise reduced to a desired level.

Figure 5A:
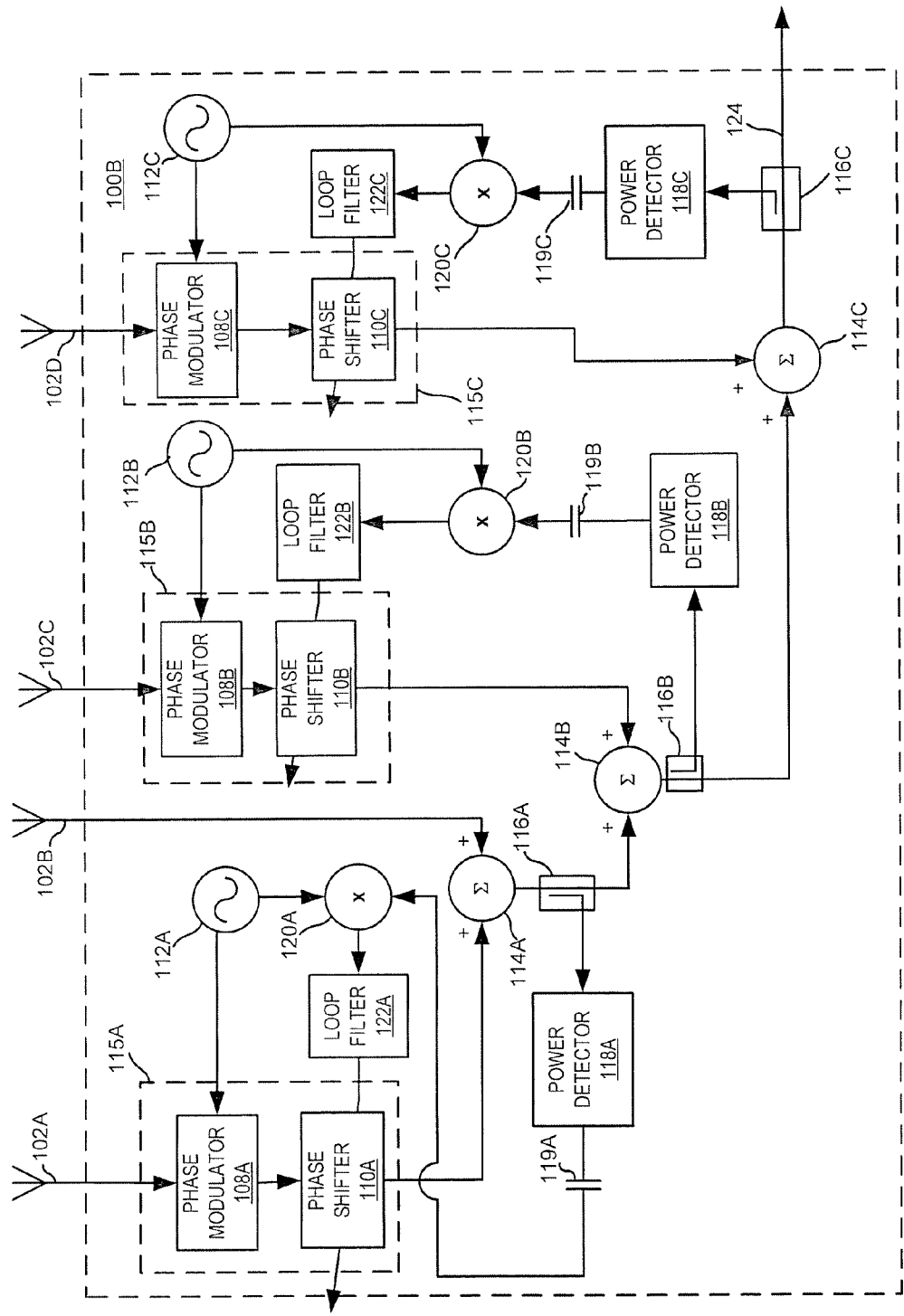

FIG. 5A illustrates a combiner 100B according to some embodiments configured to perform periodic phase adjustment and non-periodic phase adjustment of a diversity signal received using four antennas, as illustrated in FIG. 2. Referring to FIG. 5A, a continuous combiner 100B (analogous to the processor 40 of the embodiments of FIG. 2) receives input signals from four antennas 102A to 102D. Although not illustrated in FIG. 4, the signals received over one or more of the antennas 102A to 102D can be subjected to a fixed delay that equalizes the electrical path length leading to the inputs of the combiner 100A.

The first input signal received over the first antenna 102A is adjusted by a first amplitude/phase adjustor 115A including at least a first phase modulator 108A and a first phase shifter 110A. The first amplitude/phase adjustor 115A adjusts the first input signal and outputs an adjusted signal.

A first low frequency oscillator 112A provides a low-frequency sinusoidal signal at a first adjustment frequency $\omega_{m1}$ that is used by the first phase modulator 108A to modulate the phase of the signal. The first adjustment frequency $\omega_{m1}$ may be, for example, 10 Hz.

The second input signal received via the second antenna 102B is fed into a first summing node 114A, where it is added to the adjusted signal output by the first amplitude/phase adjustor 115A to generate a first intermediate output signal.

A first power detector 118A receives the first intermediate output signal via a first signal coupler 116A, and responsively outputs a power detection signal. The power detection signal is passed through a first high pass filter (such as a capacitor) 119A and is mixed with the low-frequency sinusoid output by the first low-frequency oscillator 112A, and the result is filtered with a first loop filter 122A, the output of which controls the first phase shifter 110A to vary the non-periodic phase adjustment by the first phase shifter 110A until periodic amplitude variation in the first intermediate output signal in response to the periodic phase adjustment is minimized or otherwise reduced to a desired level.

The third input signal received over the third antenna 102C is adjusted by a second amplitude/phase adjustor 115B including at least a second phase modulator 108B and a second phase shifter 110B. The second amplitude/phase adjustor 115B adjusts the third input signal and outputs an adjusted signal.

A second low frequency oscillator 112B provides a low-frequency sinusoidal signal at a frequency $\omega_{m2}$ that is used by the second phase modulator 108A to modulate the phase of the input signal. The second adjustment frequency $\omega_{m2}$ may be different from the first adjustment frequency $\omega_{m1}$, and may be, for example, 30 Hz.

The adjusted signal output by the second amplitude/phase adjustor 115B is added to the first intermediate output signal at a second summing node 114B to generate a second intermediate output signal.

A second power detector 118B receives the second intermediate output signal via a second signal coupler 116B, and responsively outputs a power detection signal. The power detection signal is passed through a second high pass filter (such as a capacitor) 119B and is mixed with the low-frequency sinusoid output by the second low-frequency oscillator 112B, and the result is filtered with a second loop filter 122B, the output of which controls the second phase shifter 110B to vary the non-periodic phase adjustment by the phase shifter 110B until periodic amplitude variation in the second intermediate output signal in response to the periodic phase adjustment is minimized or otherwise reduced to a desired level.

The fourth input signal received via the fourth antenna 102D is adjusted by a third amplitude/phase adjustor 115C including at least a third phase modulator 108C and a third phase shifter 110C. The third amplitude/phase adjustor 115C adjusts the fourth input signal and outputs an adjusted signal.

A third low frequency oscillator 112C provides a low-frequency sinusoidal signal at a third adjustment frequency $\omega_{m3}$ that is used by the third phase modulator 108C to modulate the phase of the signal. The third adjustment frequency $\omega_{m3}$ may be a different frequency from the first and second adjustment frequencies $\omega_{m1}$ and $\omega_{m1}$, and may be, for example, 50 Hz.

The second intermediate output signal output by the second summing node 114B is fed into a third summing node 114C, where it is added to the adjusted signal output by the third amplitude/phase adjustor 115C to generate a combined output signal 124.

A third power detector 118C receives the combined output signal 124 via a third signal coupler 116C, and responsively outputs a power detection signal. The power detection signal is passed through a third high pass filter (such as a capacitor) 119C and is mixed with the low-frequency sinusoid output by the third low-frequency oscillator 112C, and the result is filtered with a third loop filter 122C, the output of which controls the third phase shifter 110C to vary the non-periodic phase adjustment by the third phase shifter 110C until periodic amplitude variation in the combined output signal 124 in response to the periodic phase adjustment is minimized or otherwise reduced to a desired level.

Figure 5B:
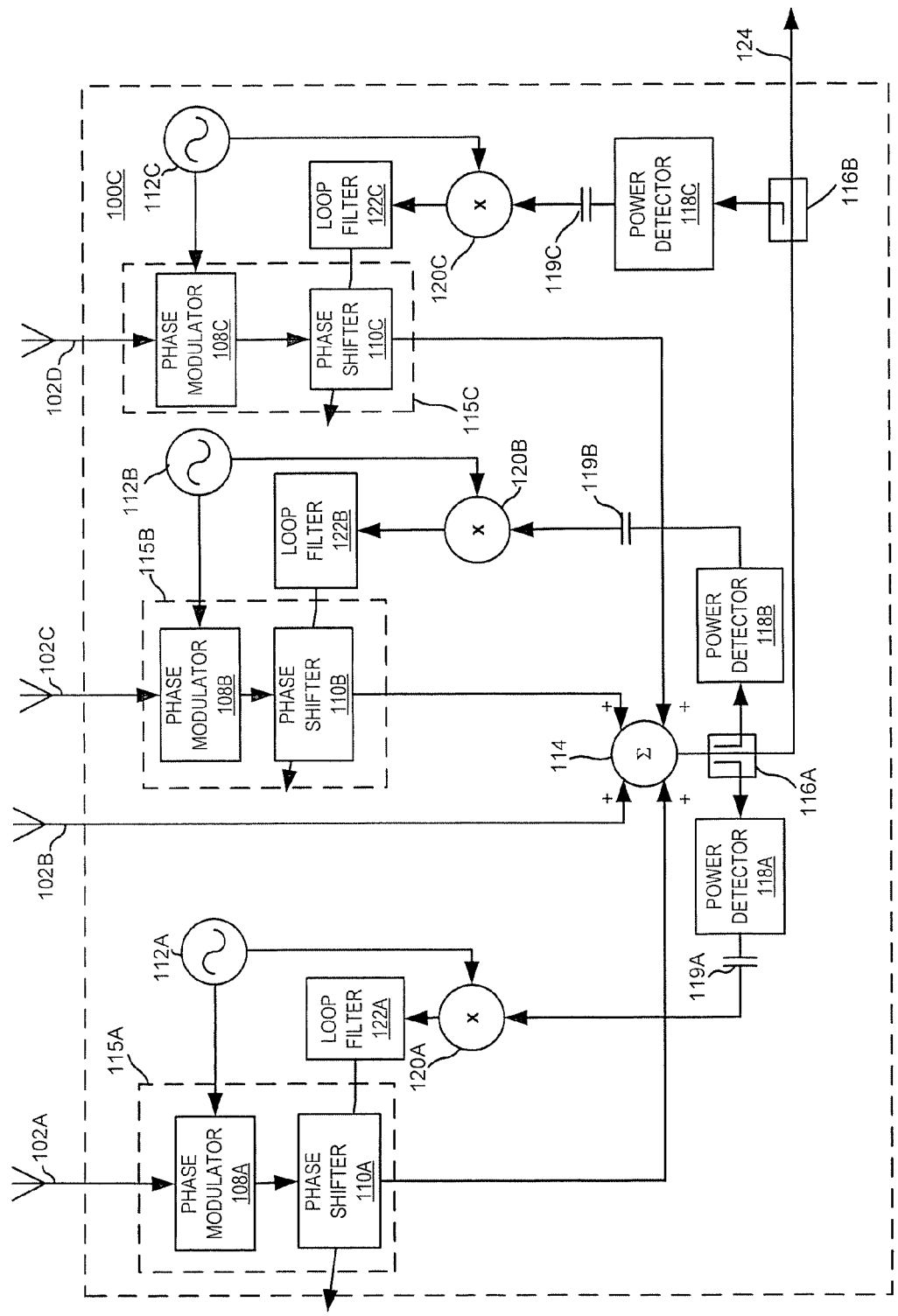

FIG. 5B illustrates a combiner 100C according to some embodiments configured to perform periodic phase adjustment and non-periodic phase adjustment of a diversity signal received using four antennas, as illustrated in FIG. 2. Referring to FIG. 5B, a continuous combiner 100C (analogous to the processor 40 of the embodiments of FIG. 2) receives input signals from four antennas 102A to 102D. Although not illustrated in FIG. 4, the signals received over one or more of the antennas 102A to 102D can be subjected to a fixed delay that equalizes the electrical path length leading to the inputs of the combiner 100A.

In the embodiments of FIG. 5B, three of the four antenna signals are adjusted as described above, and all four signals (including the three adjusted signals) are added together at a common summing node 114 to generate a combined output signal 124.

In particular, the first input signal received over the first antenna 102A is adjusted by a first amplitude/phase adjustor 115A including at least a first phase modulator 108A and a first phase shifter 110A.

A first low frequency oscillator 112A provides a low-frequency sinusoidal signal at a first adjustment frequency $\omega_{m1}$ that is used by the first phase modulator 108A to modulate the phase of the input signal. The first adjustment frequency $\omega_{m1}$ may be, for example, 10 Hz.

A first power detector 118A receives the combined output signal via a first signal coupler 116A, and responsively outputs a power detection signal. The power detection signal is passed through a first high pass filter (such as a capacitor) 119A and is mixed with the low-frequency sinusoid output by the first low-frequency oscillator 112A, and the result is filtered with a first loop filter 122A, the output of which controls the first phase shifter 110A to vary the non-periodic phase adjustment by the first phase shifter 110A.

The second input signal received via the second antenna 102B is fed into the common summing node 114.

The third input signal received over the third antenna 102C is adjusted by a second amplitude/phase adjustor 115B including at least a second phase modulator 108B and a second phase shifter 110B. The second amplitude/phase adjustor 115B adjusts the third input signal and outputs an adjusted signal.

A second low frequency oscillator 112B provides a low-frequency sinusoidal signal at a frequency $\omega_{m2}$ that is used by the second phase modulator 108A to modulate the phase of the input signal. The second adjustment frequency $\omega_{m2}$ may be different from the first adjustment frequency $\omega_{m1}$, and may be, for example, 1 Hz.

The adjusted signal output by the second amplitude/phase adjustor 115B is fed into the common summing node 114.

A second power detector 118B receives the combined output signal via the first signal coupler 116A, and responsively outputs a power detection signal. The power detection signal is passed through a second high pass filter (such as a capacitor) 119B and is mixed with the low-frequency sinusoid output by the second low-frequency oscillator 112B, and the result is filtered with a second loop filter 122B, the output of which controls the second phase shifter 110B to vary the non-periodic phase adjustment by the phase shifter 110B.

The fourth input signal received via the fourth antenna 102D is adjusted by a third amplitude/phase adjustor 115C including at least a third phase modulator 108C and a third phase shifter 110C. The third amplitude/phase adjustor 115C adjusts the fourth input signal and outputs an adjusted signal.

A third low frequency oscillator 112C provides a low-frequency sinusoidal signal at a third adjustment frequency $\omega_{m3}$ that is used by the third phase modulator 108C to modulate the phase of the input signal. The third adjustment frequency $\omega_{m3}$ may be a different frequency from the first and second adjustment frequencies $\omega_{m1}$ and $\omega_{m1}$, and may be, for example, 100 Hz.

The adjusted signal output by the third phase shifter 110C is fed into the common summing node 114.

A third power detector 118C receives the combined output signal 124 via a second signal coupler 116B, and responsively outputs a power detection signal. The power detection signal is passed through a third high pass filter (such as a capacitor) 119C and is mixed with the low-frequency sinusoid output by the third low-frequency oscillator 112C, and the result is filtered with a third loop filter 122C, the output of which controls the third phase shifter 110C to vary the non-periodic phase adjustment by the third phase shifter 110C.

The non-periodic phase adjustments by the first, second and third phase shifters 110A, 110B and 110C are adjusted until periodic amplitude variation in the combined output signal 124 in response to the periodic phase adjustment is minimized or otherwise reduced to a desired level.

Figure 6A:
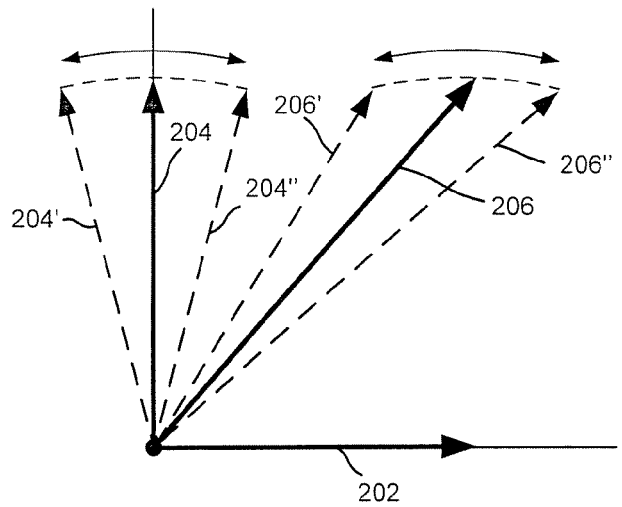
FIGS. 6A, 6B and 6C are graphs illustrating phase modulation according to some embodiments.
Figure 6B:
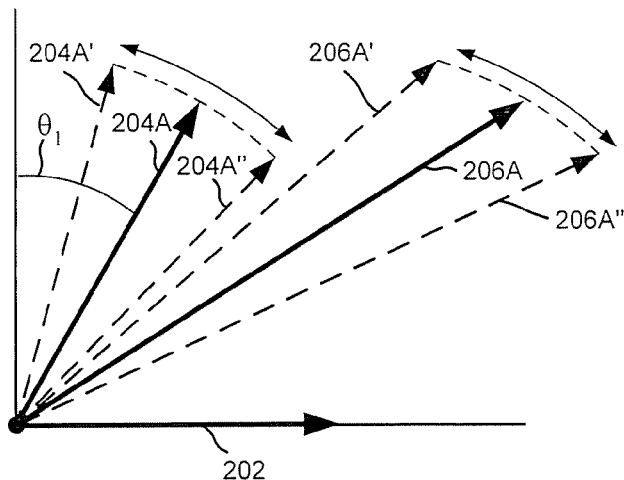
Figure 6C:
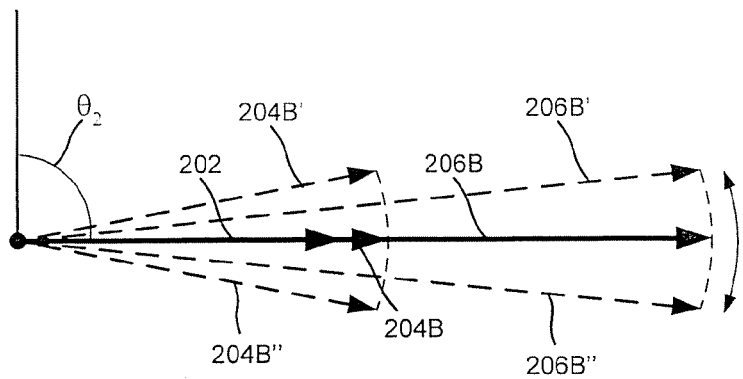

FIGS. 6A-6C provide a graphical illustration of some operations of the combiner 100. In particular, FIGS. 6A-6C are phasor diagrams showing the effects in vector space of periodic and non-periodic phase adjustment of a diversity signal that is combined with a primary signal.

FIG. 6A illustrates a primary signal 202, a diversity signal 204 and a combined signal 206 that is represented as a vector sum of the primary signal 202 and the diversity signal 204. In the example illustrated in FIGS. 6A-6C, the diversity signal 204 is rotated from the primary signal 202 by a phase of 90° before phase adjustment. As the phase of the diversity signal 204 is modulated (i.e., periodically adjusted), the vector representing the diversity signal 204 oscillates between a first position 204' and a second position 204". Consequently, the vector representing the combined signal 206 oscillates between a first position 206' and a second position 206". As is apparent from FIG. 6A, the combined signal at the first position 206' has a smaller amplitude than the combined signal at the second position 206". Thus, the combined signal 206 exhibits a relatively large periodic amplitude variation.

FIG. 6B illustrates a primary signal 202, a diversity signal 204A and a combined signal 206A, where the diversity signal 204A has been phase shifted by a non-periodic phase adjustment $\theta_1$. As the phase of the diversity signal 204A is periodically adjusted, the vector representing the diversity signal 204A oscillates between a first position 204A' and a second position 204A". Consequently, the vector representing the combined signal 206A oscillates between a first position 206A' and a second position 206A". Comparing FIG. 6A and FIG. 6B, periodic amplitude variation of the combined signal 206A of FIG. 6B is smaller than that of the combined signal 206 of FIG. 6A.

Referring to FIG. 6C, the adjusted diversity signal 204B has been phase shifted by a non-periodic phase adjustment $\theta_2$, where $\theta_2$ is about equal to 90° (i.e., the amount the phase of the diversity signal 204 was originally rotated from the phase of the main signal 202). In this case, the periodic amplitude variation of the combined signal 206B is reduced to a minimum. Consequently, the received signal power of the combined signal 206B is at a maximum.

Figure 7:
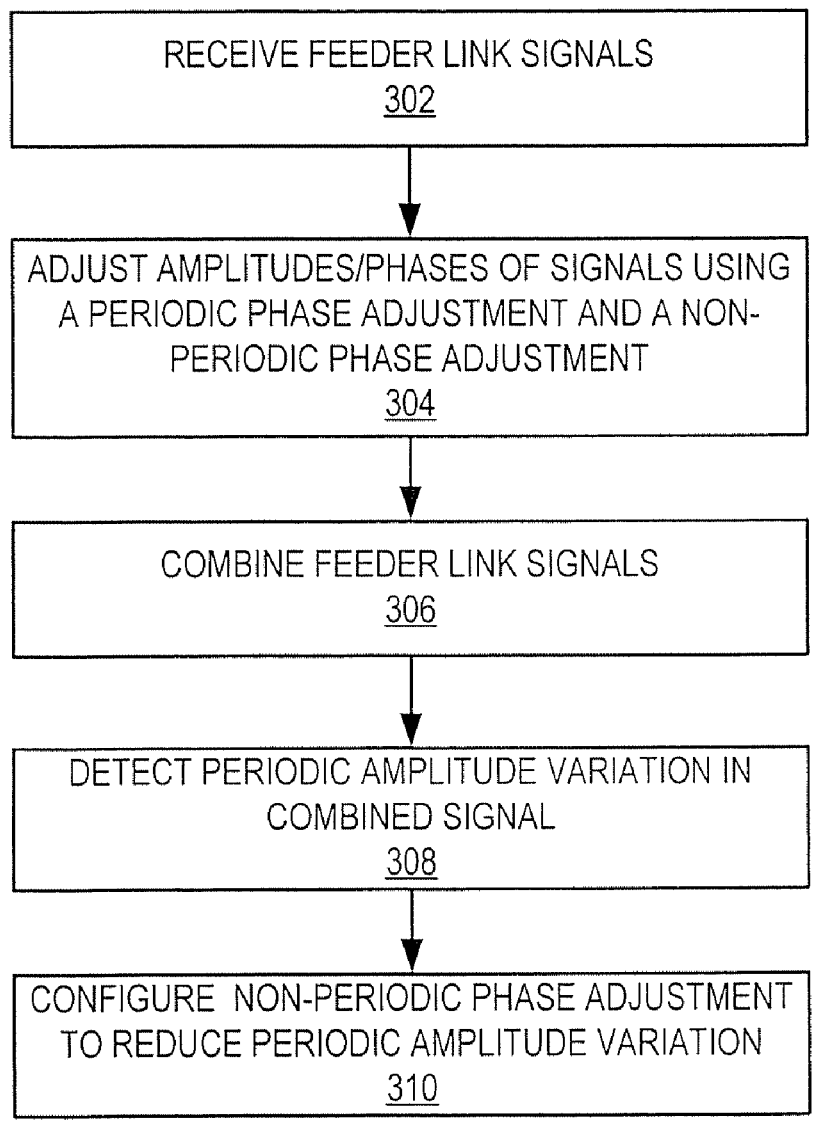
FIGS. 7 and 8 are flowcharts illustrating systems/methods according to some embodiments.
Figure 8:
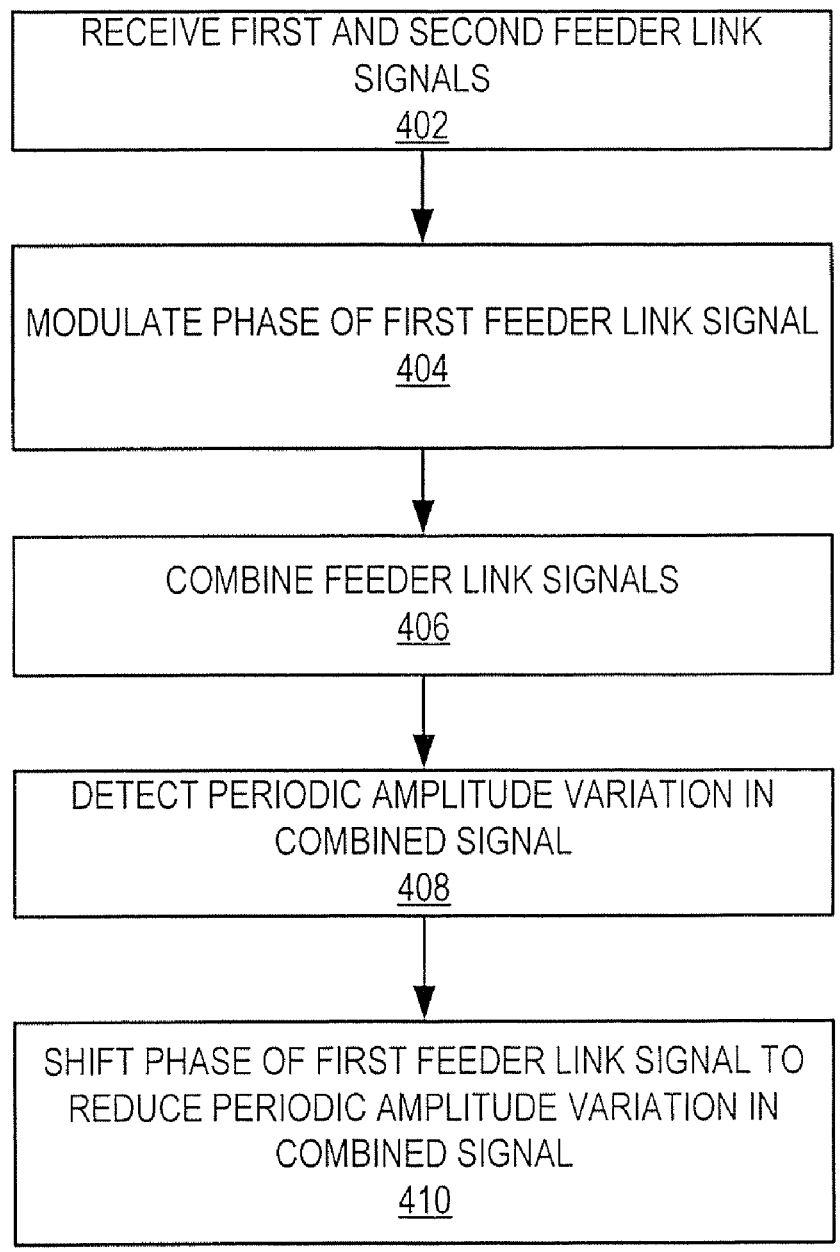

Systems/methods according to some embodiments are illustrated in FIGS. 7 and 8. Referring to FIGS. 1 and 7, a plurality of return feeder link signals 11a-11d are received at a satellite gateway 30 (Block 302). Amplitudes/phases of at least some of the return feeder link signals are adjusted using a periodic phase adjustment and a non-periodic phase adjustment (Block 304). For example, phases of at least some of the return feeder link signals can be modulated using one or more periodic functions, and/or can be shifted by one or more phase delays. The feeder link signals are combined (Block 306), and periodic amplitude variation in the combined signal is detected, for example, using a power detector (Block 308). The non-periodic phase adjustment is then configured to reduce and/or minimize the periodic amplitude variation in the combined signal (Block 310). Accordingly, signal power of the combined signal can be increased, thereby offsetting some of the effects of power robbing in a satellite return feeder link.

Referring to FIG. 8, a plurality of return feeder link signals are received at a satellite gateway 30 (Block 402). The phase of a first return feeder link signal is modulated using a periodic function, such as a sine function (Block 404). The feeder link signals are combined (Block 406), and periodic amplitude variation in the combined signal is detected, for example, using a power detector (Block 408). The phase of the first return feeder link signal is then shifted by a phase delay to reduce and/or minimize the periodic amplitude variation in the combined signal (Block 410). Accordingly, signal power of the combined signal can be increased, thereby offsetting some of the effects of power robbing in a satellite return feeder link.

Embodiments of the present invention may be sharply contrasted with feeder link space diversity switching that may be conventionally used to reduce the effects of rain fading and/or other local disturbances on a feeder link. In accordance with feeder link space diversity switching, at least first and second spatially distant feeder link antennas are used to provide respective first and second feeder link signals to a satellite gateway. However, the first and second feeder link signals are generally not combined. Instead, either the first or the second signal is chosen, depending on a signal strength threshold/criterion, and is provided to the satellite gateway for further processing and demodulation. In sharp contrast, in some embodiments the various return feeder link signals 11*a*-11*d* are combined by processor 40 at a radio frequency (RF) of the return feeder link and/or at an intermediate frequency (IF) associated with the return feeder link (not shown). Combination at base band is not performed in these embodiments, obviating a need for a plurality of gateway signal paths and associated equipment thereof. Instead, combination at RF and/or IF is performed, as described above, and a single (combined) signal, signal 17, is used via one gateway down conversion signal path to generate one or more signals at base band for information recovery. In other embodiments, diversity combining of base band signals may also be performed in addition to combining at RF and/or IF as shown in FIGS. 1-5B. This may be performed, for example, in a system using a Code Division Multiple Access (CDMA) air interface. By adjusting the phase of the feeder link signals and combining the signals at RF/IF, as described herein, some embodiments of the present invention can provide operations that can have an effect of increasing a feeder link aperture of the satellite antenna and/or a capability (e.g., size) of a feeder link power amplifier of the satellite without a need to increase a size, weight, and/or cost thereof. In fact, by reducing the effect of interference, a lower power amplifier and/or a smaller antenna may be used at the satellite thereby allowing reduction of the cost, weight and/or complexity of the satellite.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of processing return feeder link signals at a satellite gateway including a plurality of spatially diverse receive antennas, the method comprising:
   receiving respective return feeder link signals at each of the plurality of receive antennas;
   selectively adjusting amplitudes and/or phases of a plurality of the return feeder link signals received at the plurality of receive antennas in response to amplitude/phase adjustment settings to provide a plurality of adjusted return feeder link signals;
   combining the plurality of adjusted feeder link signals to generate a combined return feeder link signal;
   detecting periodic amplitude variation in the combined return feeder link signal; and
   configuring the amplitude/phase adjustment settings in response to the combined return feeder link signal to reduce the periodic amplitude variation in the combined return feeder link signal.

2. The method of claim 1, wherein configuring the amplitude/phase adjustment settings comprises providing non-periodic phase adjustment signals to a plurality of amplitude/phase adjustors that process the plurality of return feeder link signals.

3. The method of claim 1, wherein selectively adjusting amplitudes and/or phases of the return feeder link signals comprises adjusting the amplitude/phase of a first one of the return feeder link signals at a first adjustment frequency and adjusting the amplitude/phase of a second one of the return feeder link signals at a second adjustment frequency that is different from the first adjustment frequency.

4. The method of claim 3, wherein the first adjustment frequency is 10 Hz and the second adjustment frequency is 50 Hz.

5. The method of claim 3, further comprising adjusting amplitudes/phases of the first and second return feeder link signals using respective first and second periodic functions that are in phase quadrature therebetween.

6. The method of claim 5, wherein the first and second periodic functions comprise sinusoidal functions.

7. The method of claim 1, wherein the plurality of receive antennas comprises four antennas, the method further comprising:
   receiving first, second, third and fourth return feeder link signal at respective ones of the plurality of receive antennas;
   selectively adjusting amplitudes and/or phases of the first and second return feeder link signals received at the first and second receive antennas to generate respective first and second adjusted feeder link signals;
   combining the first adjusted feeder link signal and the third return feeder link signal to generate a first intermediate combined signal;
   combining the second adjusted feeder link signal and the fourth return feeder link signal to generate a second intermediate combined signal; and
   combining the first intermediate combined signal and the second intermediate combined signal to generate the combined return feeder link signal.

8. The method of claim 7, further comprising:
   adjusting an amplitude and/or phase of the first intermediate combined signal to generate an adjusted intermediate combined signal;
   wherein combining the first intermediate combined signal and the second intermediate combined signal comprises combining the adjusted intermediate combined signal and the second intermediate combined signal.

9. The method of claim 1, wherein the plurality of receive antennas comprises four antennas, the method further comprising:
   receiving first, second, third and fourth return feeder link signal at respective ones of the plurality of receive antennas;
   selectively adjusting amplitudes and/or phases of the first, second and third return feeder link signals received at the first, second and third receive antennas to generate respective first, second and third adjusted feeder link signals; and
   combining the first, second and third adjusted feeder link signals and the fourth return feeder link signal to generate the combined return feeder link signal.

10. The method of claim 1, wherein combining the plurality of adjusted feeder link signals to generate a combined return feeder link signal comprises RF combining the signals.

11. The method of claim 1, further comprising converting the feeder link signals to an intermediate frequency, wherein combining the plurality of adjusted feeder link signals to generate a combined return feeder link signal comprises combining intermediate frequency signals.

12. The method of claim 1, further comprising:
converting the combined return feeder link signal to baseband; and
combining the baseband combined return feeder link signal with another baseband signal.

13. A satellite gateway comprising:
a plurality of receive antennas; and
a processor coupled to the plurality of receive antennas and configured to receive respective return feeder link signals from each of the plurality of receive antennas, configured to selectively adjust amplitudes and/or phases of a plurality of the return feeder link signals received at the plurality of receive antennas in response to amplitude/phase adjustment settings to provide a plurality of adjusted return feeder link signals, and configured to combine the plurality of adjusted feeder link signals to generate a combined return feeder link signal;
wherein the processor comprises a control circuit configured to detect periodic amplitude variation in the combined return feeder link signal, and to configure the amplitude/phase adjustment settings in response to periodic amplitude variation in the combined return feeder link signal to reduce periodic amplitude variation in the combined return feeder link signal.

14. The satellite gateway of claim 13, wherein the control circuit is configured to provide non-periodic phase adjustment signals to a plurality of amplitude/phase adjustors that process the plurality of return feeder link signals.

15. The satellite gateway of claim 13, wherein the processor comprises a first amplitude/phase adjustor that is configured to selectively adjust the amplitude/phase of a first one of the return feeder link signals at a first adjustment frequency and a second amplitude/phase adjustor that is configured to selectively adjust the amplitude/phase of a second one of the return feeder link signals at a second adjustment frequency that is different from the first adjustment frequency.

16. The satellite gateway of claim 15, wherein the first adjustment frequency is 10 Hz and the second adjustment frequency is 50 Hz.

17. The satellite gateway of claim 15, wherein the first amplitude/phase adjustor and the second amplitude/phase adjustor adjust amplitudes/phases of the first and second return feeder link signals using respective first and second periodic functions that are in phase quadrature therebetween.

18. The satellite gateway of claim 17, wherein the first and second periodic functions comprise sinusoidal functions.

19. The satellite gateway of claim 13, wherein the plurality of receive antennas comprises four antennas, and wherein the processor further comprises:
a first amplitude/phase adjustor configured to selectively adjust amplitude/phase of a first return feeder link signal;
a second amplitude/phase adjustor configured to selectively adjust amplitude/phase of a second return feeder link signal;
a first combiner configured to combine the first return feeder link signal and a third return feeder link signal to form a first intermediate combined signal;
a second combiner configured to combine the second return feeder link signal and a fourth return feeder link signal to form a second intermediate combined signal; and
a third combiner configured to combine the first intermediate combined signal and the second intermediate combined signal to generate a combined return feeder link signal.

20. The satellite gateway of claim 19, wherein the processor further comprises:
a third amplitude/phase adjustor configured to selectively adjust amplitude/phase of the first intermediate combined signal to generate an adjusted intermediate combined signal;
wherein the third combiner is configured to combine the adjusted intermediate combined signal and the second intermediate combined signal.

21. The satellite gateway of claim 13, wherein the plurality of receive antennas comprises four antennas, and wherein the processor further comprises:
a first amplitude/phase adjustor configured to selectively adjust amplitude/phase of a first return feeder link signal;
a second amplitude/phase adjustor configured to selectively adjust amplitude/phase of a second return feeder link signal;
a third amplitude/phase adjustor configured to selectively adjust amplitude/phase of a third return feeder link signal; and
a combiner configured to combine the first return feeder link signal, the second return feeder link signal, the third return feeder link signal and a fourth return feeder link signal to form the combined return feeder link signal.

22. A method of processing return feeder link signals at a satellite gateway including a first and second receive antennas, the method comprising:
receiving first and second return feeder link signals at the first and second receive antennas, respectively;
modulating a phase of the first return feeder link signal to form an adjusted first feeder link signal;
combining the adjusted first feeder link signal with the second return feeder link signal to form a combined feeder link signal;
detecting periodic amplitude variation in the combined feeder link signal;
shifting a phase of the first return feeder link signal to reduce the periodic amplitude variation in the combined feeder link signal;
receiving third and fourth return feeder link signals at respective third and fourth receive antennas;
modulating a phase of the third return feeder link signal to form an adjusted third feeder link signal;
combining the adjusted third feeder link signal with the fourth return feeder link signal to form a second combined feeder link signal;
detecting periodic amplitude variation in the second combined feeder link signal; and
shifting a phase of the third return feeder link signal to reduce periodic amplitude variation in the second combined feeder link signal.

23. The method of claim 22, further comprising:
modulating a phase of the combined feeder link signal to form an adjusted combined feeder link signal;
combining the adjusted combined feeder link signal with the second combined feeder link signal to form a third combined feeder link signal;

detecting periodic amplitude variation in the third combined feeder link signal; and shifting a phase of the combined feeder link signal to reduce periodic amplitude variation in the third combined feeder link signal.

24. The method of claim 22, further comprising:

receiving third and fourth return feeder link signals at respective third and fourth receive antennas; and modulating phases of the third and fourth return feeder link signals to form an adjusted third feeder link signal and an adjusted third feeder link signal;

wherein combining the adjusted first feeder link signal with the second return feeder link signal to form the combined feeder link signal comprises combining the adjusted first feeder link signal, the second return feeder link signal, the adjusted third feeder link signal and the adjusted fourth feeder link signal to form the combined feeder link signal.

25. A satellite gateway, comprising:

a processor configured to receive first and second return feeder link signals from first and second receive antennas, respectively;

a phase modulator configured to modulate a phase of the first return feeder link signal;

a phase shifter configured to shift a phase of the first return feeder link signal by a phase delay;

a combiner configured to combine the first return feeder link signal with the second return feeder link signal to form a combined feeder link signal;

a power detector configured to detect periodic amplitude variation in the combined feeder link signal; and a feedback loop from the power detector to the phase shifter configured to adjust the phase delay to reduce periodic amplitude variation in the combined feeder link signal;

wherein the processor is further configured to receive third and fourth return feeder link signals from respective third and fourth receive antennas, and wherein the processor further comprises:

a second phase modulator configured to modulate a phase of the third return feeder link signal;

a second phase shifter configured to shift a phase of the third return feeder link signal by a second phase delay;

a second combiner configured to combine the third return feeder link signal with the fourth return feeder link signal to form a second combined feeder link signal;

a second power detector configured to detect periodic amplitude variation in the second combined feeder link signal; and a second feedback loop from the second power detector to the second phase shifter configured to adjust the second phase delay to reduce periodic amplitude variation in the second combined feeder link signal.

26. The satellite gateway of claim 25, further comprising:

a third phase modulator configured to modulate a phase of the combined feeder link signal;

a third phase shifter configured to shift a phase of the third combined feeder link signal by a third phase delay;

a third combiner configured to combine the combined feeder link signal with the second combined feeder link signal to form a third combined feeder link signal;

a third power detector configured to detect periodic amplitude variation in the third combined feeder link signal; and a third feedback loop from the third power detector to the third phase shifter configured to adjust the third phase delay to reduce periodic amplitude variation in the third combined feeder link signal.

27. A satellite gateway, comprising:

a processor configured to receive first and second return feeder link signals from first and second receive antennas, respectively;

a phase modulator configured to modulate a phase of the first return feeder link signal;

a phase shifter configured to shift a phase of the first return feeder link signal by a phase delay;

a combiner configured to combine the first return feeder link signal with the second return feeder link signal to form a combined feeder link signal;

a power detector configured to detect periodic amplitude variation in the combined feeder link signal; and a feedback loop from the power detector to the phase shifter configured to adjust the phase delay to reduce periodic amplitude variation in the combined feeder link signal;

wherein the processor is further configured to receive third and fourth return feeder link signals from respective third and fourth receive antennas, and wherein the processor further comprises:

a second phase modulator configured to modulate a phase of the third return feeder link signal;

a second phase shifter configured to shift a phase of the third return feeder link signal by a second phase delay;

a third phase modulator configured to modulate a phase of the fourth return feeder link signal; and a third phase shifter configured to shift a phase of the fourth return feeder link signal by a third phase delay;

wherein the combiner is configured to combine the first, second, third and fourth return feeder link signals to form the combined feeder link signal.

* * * * *